(12) United States Patent
Trogan et al.

(10) Patent No.: US 10,476,293 B2
(45) Date of Patent: Nov. 12, 2019

(54) FLEXIBLE ENERGY HARVESTING ANTENNA

(71) Applicant: Analog Devices, Inc., Norwood, MA (US)

(72) Inventors: Roman Trogan, Needham, MA (US); Yosef Stein, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 260 days.

(21) Appl. No.: 15/481,259

(22) Filed: Apr. 6, 2017

(65) Prior Publication Data
US 2017/0294701 A1 Oct. 12, 2017

Related U.S. Application Data

(60) Provisional application No. 62/319,034, filed on Apr. 6, 2016.

(51) Int. Cl.
| | |
|---|---|
| *H02J 7/02* | (2016.01) |
| *H02J 50/20* | (2016.01) |
| *H01Q 1/24* | (2006.01) |
| *H01Q 1/38* | (2006.01) |
| *H02J 50/27* | (2016.01) |

(52) U.S. Cl.
CPC ............ *H02J 7/025* (2013.01); *H01Q 1/248* (2013.01); *H01Q 1/38* (2013.01); *H02J 50/20* (2016.02); *H02J 50/27* (2016.02)

(58) Field of Classification Search
CPC ............ H02J 50/20; H02J 7/025; H02J 50/27; H01Q 1/38; H01Q 1/248
See application file for complete search history.

(56) References Cited

U.S. PATENT DOCUMENTS

| | | | | |
|---|---|---|---|---|
| 5,214,571 A | * | 5/1993 | Dahlgren | H05K 3/4635 174/255 |
| 2004/0090369 A1 | * | 5/2004 | McCarrick | H01Q 1/38 343/700 MS |
| 2011/0061658 A1 | * | 3/2011 | Koorn | A61M 16/04 128/207.14 |
| 2011/0121972 A1 | * | 5/2011 | Phaneuf | G06K 7/10178 340/572.8 |

(Continued)

FOREIGN PATENT DOCUMENTS

WO WO 2015/019106 A2 2/2015

OTHER PUBLICATIONS

Khaleel et al., Chapter 15: Design, Fabrication, and Testing of Flexible Antennas. In "Advancement in Microstrip Antennas with Recent Applications". Kishk, ed. Mar. 6, 2013;363-83.

*Primary Examiner* — Jared Fureman
*Assistant Examiner* — Duc M Pham
(74) *Attorney, Agent, or Firm* — Wolf, Greenfield & Sacks, P.C.

(57) ABSTRACT

Flexible antennas for harvesting electromagnetic energy are described. The flexible antenna may be a far field antenna and may comprise a flexible substrate, a first metal layer disposed on one side of the flexible substrate, and a second metal layer disposed on an opposite side of the flexible substrate. The first and second metal layers may be connected through one or more vias. The first metal layer may be sized to capture electromagnetic energy at a frequency in an ISM band.

20 Claims, 9 Drawing Sheets

(56) References Cited

U.S. PATENT DOCUMENTS

2012/0276856 A1* 11/2012 Joshi .................. A61N 1/37229
  455/73
2015/0022376 A1   1/2015 Zhang et al.
2015/0116178 A1   4/2015 Kim et al.
2015/0325920 A1* 11/2015 Urso ....................... H01Q 9/27
  343/795
2016/0006123 A1   1/2016 Li et al.

* cited by examiner

FLEXIBLE ENERGY HARVESTING ANTENNA

RELATED APPLICATIONS

This Application claims the benefit under 35 U.S.C. § 119(e) of U.S. Provisional Patent Application Ser. No. 62/319,034, entitled "FLEXIBLE ENERGY HARVESTING ANTENNA" filed on Apr. 6, 2016, which is hereby incorporated herein by reference in its entirety.

FIELD OF THE DISCLOSURE

The present application relates to devices for energy harvesting.

BACKGROUND

Energy harvesting is the process by which energy is captured from external sources. Energy harvesters are sometimes used to power electronics devices. Energy harvesters utilize ambient energy in different forms, including solar energy, thermal energy, wind energy, and kinetic energy. The harvested energy can be used to charge batteries or to directly power an electronic device, such as a sensor.

SUMMARY OF THE DISCLOSURE

According to one aspect of the present application, a flexible energy harvesting antenna is provided, which is a far field flexible energy harvesting antenna in some embodiments. The flexible energy harvesting antenna may comprise a flexible substrate having a first side and a second side opposite the first side, a first metal layer disposed in contact with the first side of the flexible substrate, a second metal layer disposed in contact with the second side of the flexible substrate, and one or more conductive vias electrically connecting the first metal layer with the second metal layer.

According to another aspect of the present application, a flexible energy harvesting antenna is provided. The flexible energy harvesting antenna may comprise a flexible substrate having a first side and a second side opposite the first side, a metal layer disposed in contact with the first side of the flexible substrate, an electronic device disposed in contact with the second side of the flexible substrate, and one or more conductive vias electrically connecting the metal layer with the electronic device.

According to yet another aspect of the present application, a method of harvesting energy with an antenna is provided. The method may comprise capturing electromagnetic energy transmitted from a wireless power source using a first metal layer disposed in contact with a first side of a flexible substrate, the flexible substrate being positioned in a far-field region of the wireless power source, and coupling the captured electromagnetic energy to a second metal layer disposed in contact with a second side of the flexible substrate via one or more vias connecting the first metal layer to the second metal layer.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
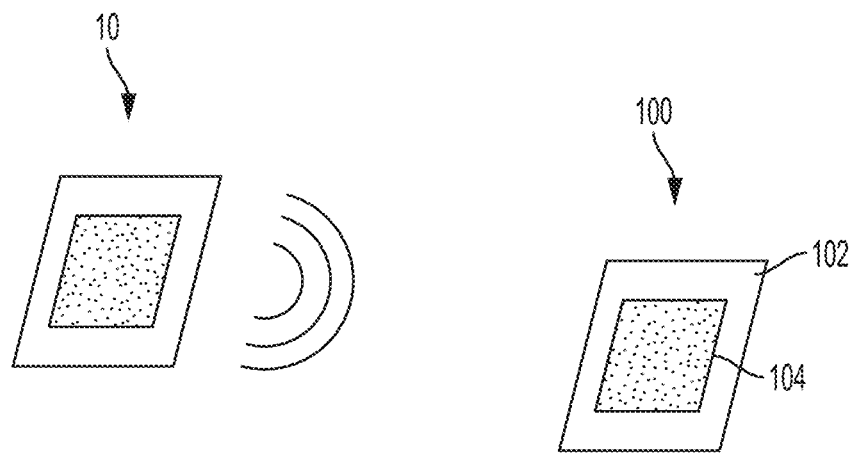
FIG. 1 is a schematic diagram illustrating an antenna system including a charging antenna and a flexible antenna, according to some non-limiting embodiments.

Applicant has appreciated that certain electronic devices may be powered by flexible energy harvesting antennas configured to harvest electromagnetic energy. Aspects of the present application provide an energy harvesting antenna disposed on a flexible substrate. Being flexible, the harvesting antenna may be disposed on and conform to curved surfaces, such as spherical surfaces, cylindrical surfaces, or any other suitable curved host. The flexible antenna may be configured to harvest at least a portion of the electromagnetic energy emitted by a charging antenna. In some embodiments, the charging antenna and the flexible antenna may be positioned such that the distance between one another is greater than the wavelength of the transmitted electromagnetic wave, and thus the flexible antenna may be a far field antenna (e.g., the flexible antenna may be placed in a region in which the electromagnetic energy transmitted by the charging antenna decays with the square of the distance). The flexible antenna may be positioned at a distance from the charging antenna that is between one wavelength (e.g., the wavelength of the carrier) and 10 meters in some embodiments, between 1 centimeter and 1 meter in some embodiments, between 1 centimeter and 50 centimeters in some embodiments, between 10 centimeter and 50 centimeters in some embodiments, between 10 centimeter and 25 centimeters in some embodiments, at any distance within such ranges or at any other suitable distance. In some embodiments, the flexible antenna is positioned at a distance from the charging antenna that is greater than the Fraunhofer distance at the wavelength of the carrier. In some embodiments, the flexible antenna may be configured to harvest electromagnetic energy oscillating at a frequency that is between 2.4 GHz and 2.5 GHz. The flexible antenna may be a patch antenna in some embodiments, having at least one continuous conductive layer.

According to an aspect of the present application, a multi-layer flexible far field energy harvesting antenna is described. The antenna comprises a plurality of layers of alternating types (e.g., flexible layers and bonding layers) with two metal layers formed on opposite sides of the flexible substrate. The first metal layer serves as an antenna configured to harvest electromagnetic energy. In some embodiments, the first metal layer forms a patch antenna (e.g., a planar solid sheet made of a conductive material). The second metal layer is coupled to the first metal layer through one or more vias. The second metal layer may serve as a ground plane. The via(s) are arranged to couple two polarizations between the first and second metal layer. The flexible antenna is configured to be coupled to the charging antenna via resonant coupling, and not via magnetic induction. In this respect, the efficiency of the coupling can be enhanced by positioning the flexible antenna in the far-field of the charging antenna. The aspects and embodiments described above, as well as additional aspects and embodiments, are described further below. These aspects and/or embodiments may be used individually, all together, or in any combination of two or more, as the application is not limited in this respect.

FIG. 1 illustrates an energy harvesting system comprising a charging antenna 10 and an energy harvesting flexible antenna 100 (referred to herein also as "flexible antenna"). Flexible antenna 100 may comprise flexible substrate 102 and a metal layer 104. Metal layer 104, which may be deposited on substrate 102, may be configured to capture electromagnetic energy. Metal layer 102 may be sized to resonate at a desired frequency.

Charging antenna 10 may be configured to emit electromagnetic radiation, at least in part, toward flexible antenna 100. Charging antenna 10 may be disposed on a flexible or a rigid substrate. Flexible antenna 100 may be configured to harvest, at least in part, the energy emitted by charging antenna 10. The energy harvested by flexible antenna 100 may be used to power one or more electronic devices, such as a sensor and/or a transceiver.

Figure 2:
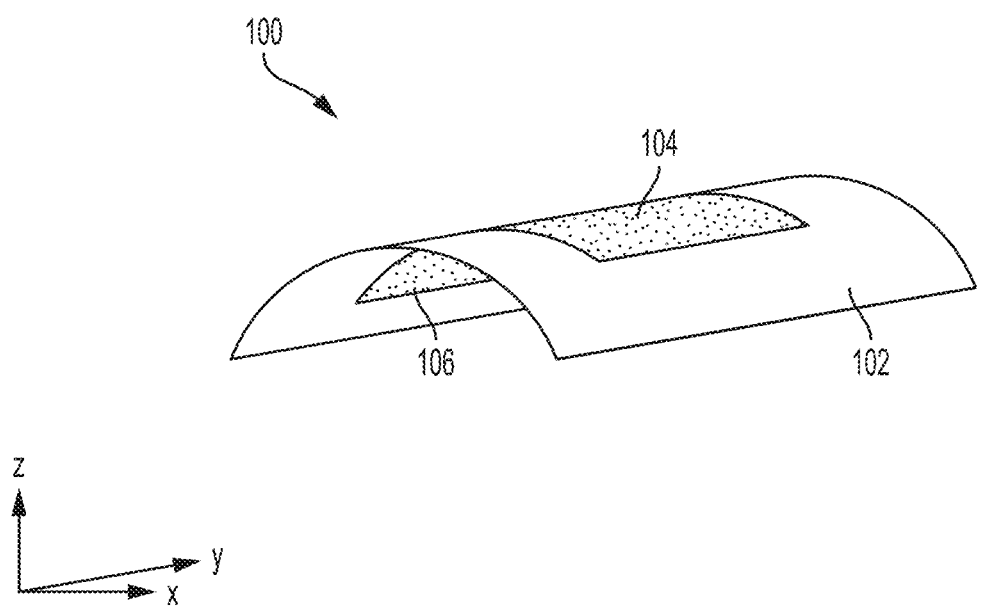
FIG. 2 is a perspective view illustrating the flexible antenna of FIG. 1, according to some non-limiting embodiments.

FIG. 2 is a perspective view of flexible antenna 100. As illustrated, flexible substrate 102 may be configured to flex. While FIG. 2 illustrates a flexible substrate being flexed in one direction, it should be appreciated that flexible antennas of the type described herein may be flexed in more than one direction in some embodiments. Flexible antenna 100 may comprise a metal layer 104, disposed on one side of flexible substrate 102, and a metal layer 106, disposed on the opposite side of flexible substrate 102. In some embodiments, metal layer 104 may be configured to capture electromagnetic energy, and metal layer 106 may configured to route the energy captured to a desired destination. In other embodiments, both metal layers may be configured to capture electromagnetic energy.

Figure 3A:
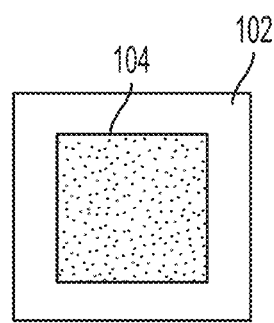
FIG. 3A is a top view of the flexible antenna of FIG. 1, according to some non-limiting embodiments.
Figure 3B:
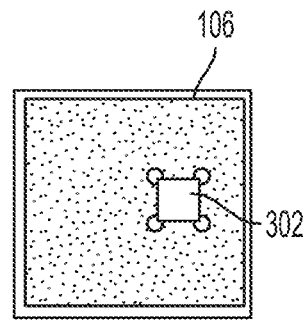
FIG. 3B is a bottom view of the flexible antenna of FIG. 1, according to some non-limiting embodiments.

FIGS. 3A and 3B illustrate a first side and a second side of an exemplary flexible antenna, respectively, according to some non-limiting embodiments. The illustrated flexible antenna may serve as the flexible antenna 100 of FIG. 1 or FIG. 2, as a non-limiting example. The first side will be referred to herein as the "front side", while the second side will be referred to herein as the "back side". FIG. 3A illustrates a flexible substrate 102 having a metal layer 104 disposed thereon. In some embodiments, metal layer 104 may form a patch antenna, such as a rectangular microstrip antenna. In these embodiments, being a patch antenna, metal layer 104 is configured to electromagnetically resonate and therefore it supports multiple modes other than the fundamental mode. In these embodiments, being a patch antenna, the coupling between charging antenna 10 and flexible antenna 100 may be of the resonant type, rather than inductive. Accordingly, coupling may only occur within a certain frequency band, which may depend on the frequency at which charging antenna 10 and flexible antenna 100 resonate. Metal layer 104 may have a surface that is between 75 mm×75 mm and 10 mm×10 mm in some embodiments, between 40 mm×40 mm and 20 mm×20 mm in some embodiments, or between any other suitable values, or range of values. However, metal layer 104 is not limited to rectangular shapes, and may be patterned with any other suitable shape. A metal layer 106 may be disposed on the back side of flexible substrate 102, as illustrated in FIG. 3B.

In some embodiments, an electronic device 302 may be disposed on the back side of flexible substrate 102. For example, a direct current (DC) unit, configured to convert the harvested energy to DC power, may be disposed on the back side of flexible substrate 102. Electronic device 302 may comprise an integrated circuit in some embodiments. Electronic device 302 may be flexible or rigid.

Figure 4A:
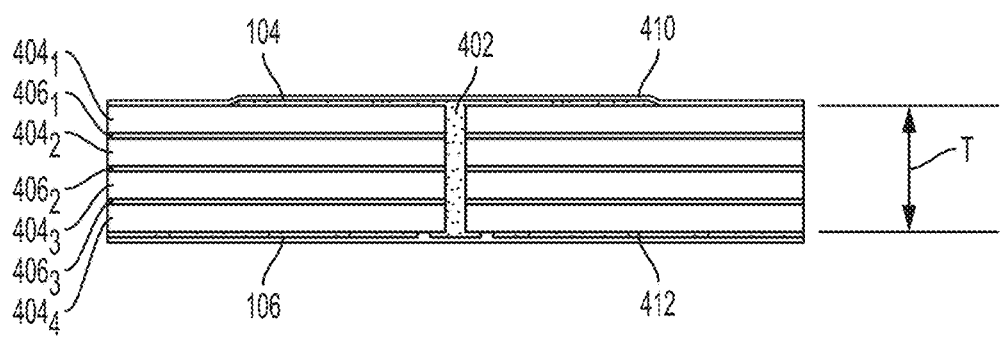
FIG. 4A is a cross sectional view of a multi-layer flexible antenna, according to some non-limiting embodiments.

In some embodiments, substrate 102 may comprise a plurality of layers. Some of these layers may be flexible. FIG. 4A is a cross sectional view of a flexible substrate, according to some non-limiting embodiments. In some embodiments, flexible substrate 102 may comprise flexible layers $404_1$, $404_2$, $404_3$ and $404_4$, and bonding layers $406_1$, $406_2$, and $406_3$. Flexible layers $404_1$, $404_2$, $404_3$ and $404_4$ may be flexible in one or more directions, and may have a thickness that is between 50 μm and 150 m, between 75 μm and 125 m, between 90 μm and 110$m$, or within any suitable range within such ranges. Flexible layers $404_1$, $404_2$, $404_3$ and $404_4$ may be made of any suitable flexible material. One example of a flexible material is polyimide. Flexible layers $404_1$, $404_2$, $404_3$ and $404_4$ may have a tensile strength that is between 50 Kpsi and 1000 Kpsi, or between 50 Kpsi and 500 Kpsi, an elongation that is greater than 40% or greater than 50%, a modulus that is between 300 Kpsi and 1000 Kpsi, and a dielectric constant that is between 3 and 4. Bonding layers $406_1$, $406_2$, and $406_3$ may be disposed between adjacent flexible layers, and may be configured to hold the flexible layers together. The use of flexible layers alternating with bonding layers as described herein may allow for a substrate that is flexible and resistant at the same time. Flexible substrate 102 may have a thickness T that is between 250 μm and 2 mm, between 250 μm and 1 mm, between 250 μm and 750 m, between 400 μm and 600 m, or within any suitable range within such ranges.

While FIG. 4A illustrates a flexible substrate having four flexible layers and three bonding layers, any other suitable numbers of flexible layers and bonding layers may be used. In some embodiments, the flexible substrate may comprise stiffener layer 410 and 412. Stiffener layer 410 may be disposed to cover at least partially metal layer 104 and stiffener layer 412 may be disposed to cover at least partially metal layer 106. Stiffener layers 410 and 412 may be configured to prevent damage to metal layers 104 and 106, respectively.

In some embodiments, metal layer 104 and metal layer 106 may be electrically coupled to one another through via 402. Via 402, made from a conductive material, may pass through the layers forming the flexible substrate. Metal layer 106 may be patterned to form metal traces configured to route the energy captured by metal layer 104 to a desired destination.

Figure 4B:
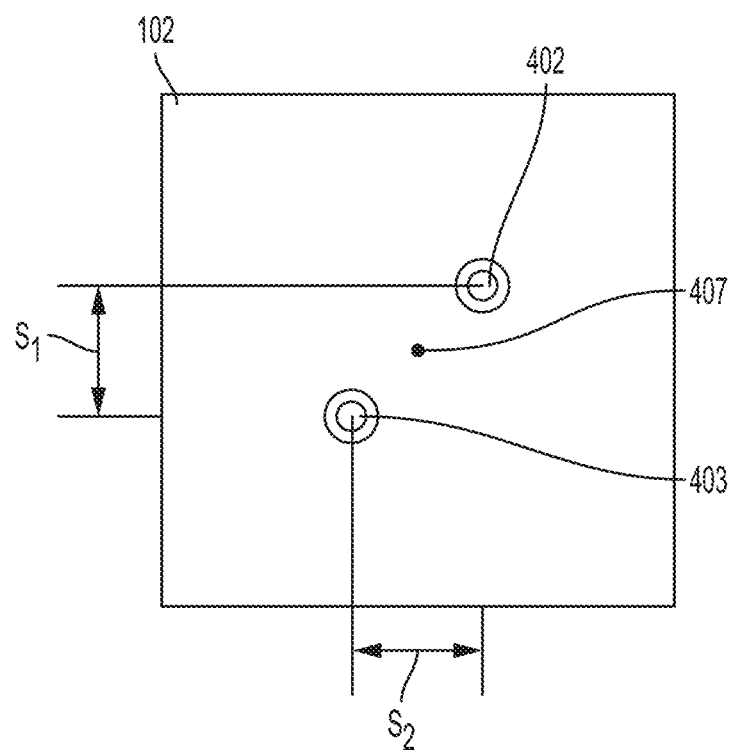
FIG. 4B is a top view of a flexible antenna including a plurality of vias, according to some non-limiting embodiments.

Flexible antennas of the type described herein may be configured to capture electromagnetic energy independently of its polarization. FIG. 4B illustrates a flexible antenna having two vias 402 and 403 connecting metal layer 104 to metal layer 106. In this configuration, the flexible antenna may be dual polarization and may be configured to harvest electromagnetic energy having any polarization. Via 402 may be configured to provide energy in response to receiving a first polarization and via 403 may be configured to provide energy in response to receiving a second polarization, orthogonal to the first polarization. Vias 402 and 403 may be separated from each other by a distance S1 in a first direction and by a distance S2 in a second direction. The first direction may be parallel to a first side edge of metal layer 104 and the second direction may be parallel to a second side edge, perpendicular to the first side edge, of metal layer 104. Distances S1 and S2 may be between 1 µm and 10 µm, between 2.5 µm and 7.5 m, or between any values between such values. In some embodiments, distances S1 and S2 are equal to each other. In some embodiments, vias 402 and 403 are disposed at symmetric locations about an axis of symmetry 407. Axis of symmetry 407 may be perpendicular to the plane defined by metal layer 104 and may pass by the center of the metal layer 104. The location of the vias may be arranged so that flexible antenna 100 is dual polarization. In other embodiments, the vias may be arranged to efficiently harvest single-axis linear polarizations, circular polarizations, and/or elliptic polarizations.

Figure 5A:
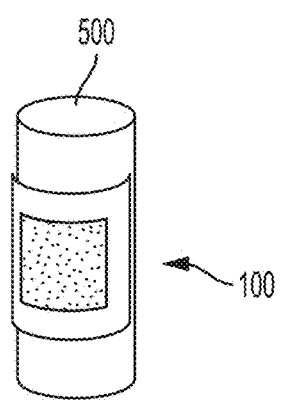
FIG. 5A is a perspective view of a rod having a flexible antenna consistent with the types described herein disposed thereon, according to some non-limiting embodiments.
Figure 5B:
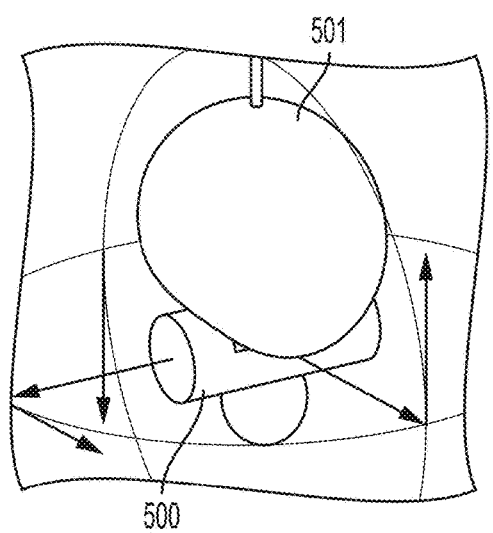
FIG. 5B illustrates an exemplary radiation diagram of a flexible antenna, according to some non-limiting embodiments.

FIG. 5A illustrates a flexible antenna 100 disposed on a rod 500 having a cylindrical shape. FIG. 5B illustrates an exemplary radiation diagram 501 associated with the flexible antenna illustrated in FIG. 5A. The flexible antenna may exhibit a gain that is between 0.5 dBi and 8 dBi in some embodiments, between 1.0 dBi and 7 dBi in some embodiments, between 2 dBi and 6 dBi in some embodiments, between 3 dBi and 5 dBi in some embodiments, or between any other suitable range. Other ranges are also possible.

Flexible antenna 100 may be configured to harvest electromagnetic energy oscillating at any suitable frequency. In some embodiments, flexible antenna 100 may be configured to harvest electromagnetic energy oscillating at a frequency that is within an industrial, scientific and medical (ISM) band. In some embodiments, such a frequency may be between 40.66 MHz and 40.7 MHz, between 433.05 MHz and 434.79 MHz, between 902 MHz and 928 MHz, between 2.4 GHz and 2.5 GHz, between 5.725 GHz and 5.875 GHz, between 24 GHz and 24.25 GHz, between 61 GHz and 61.5 GHz. Other frequencies may alternatively be used.

Figure 6:
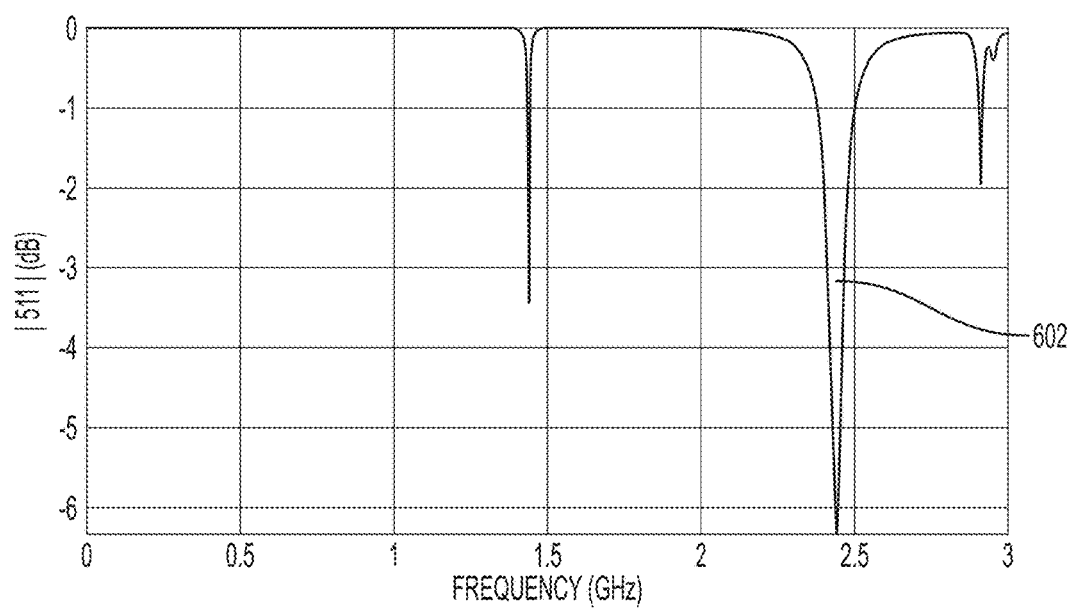
FIG. 6 is a plot illustrating the frequency response of a flexible antenna, according to some non-limiting embodiments.

FIG. 6 is a plot illustrating an exemplary frequency response associated with a flexible antenna, according to some non-limiting embodiments. In particular, FIG. 6 illustrates a scattering parameter S11 as a function of frequency. As illustrated, S11 may exhibit a dip 602 in correspondence to a frequency that is between 2.4 GHz and 2.5 GHz. Dip 602 indicates that the flexible antenna can harvest electromagnetic energy oscillating at that frequency.

Figure 7:
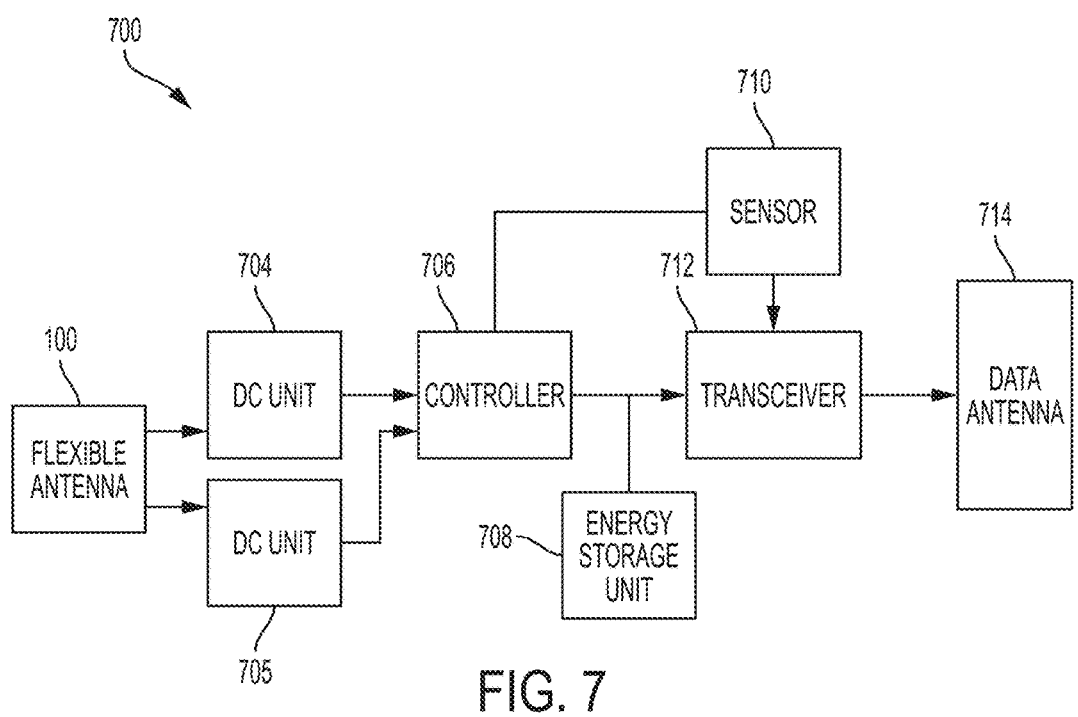
FIG. 7 is a block diagram of a system comprising a flexible antenna, according to some non-limiting embodiments.

Flexible antennas of the type described herein may be used to power an electronic system. The electronic system may be part of electronic device 302, and hence may be mounted on flexible substrate 102, or may be mounted on a separate substrate. FIG. 7 is a block diagram illustrating an electronic system 700, according to some embodiments. Electronic system 700 may comprise one or more flexible antennas 100, DC units 704 and 705, a controller 706, an energy storage unit 708, a sensor 710, a transceiver 712, and/or a data antenna 714. In some embodiments, flexible antenna 100 is dual-polarization. As such, flexible antenna 100 may generate a first electric signal in response to harvesting electromagnetic energy in one polarization and may generate a second electric signal in response to harvesting electromagnetic energy in another polarization. DC units 704 and 705 may be configured to receive the first and the second electric signal, respectively, and to convert such signals into direct current (DC) voltages. Controller 706 may comprise a processor configured perform power management. For example, controller 706 may store a portion of the energy harvested in energy storage unit 708, which may comprise one or more supercapacitors in some embodiments. Alternatively, or additionally, controller 706 may use the energy harvested to power sensor 710 and/or transceiver 712. Sensor 710 may comprise any suitable type of sensor, such as a pressure sensor, a temperature sensor, an accelerometer or a gyroscope. Sensor 710 may comprise a MEMS sensor in some embodiments. In some embodiments, sensor 710 may provide a signal representing the sensed quantity to transceiver 712. Transceiver 712 may control data antenna 714 to transmit the data collected by sensor 710 to an external monitoring station, such as a computer. Alternatively, or additionally, data antenna 714 may be configured to receive data from the external monitoring station. Data antenna 714 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol.

Figure 8:
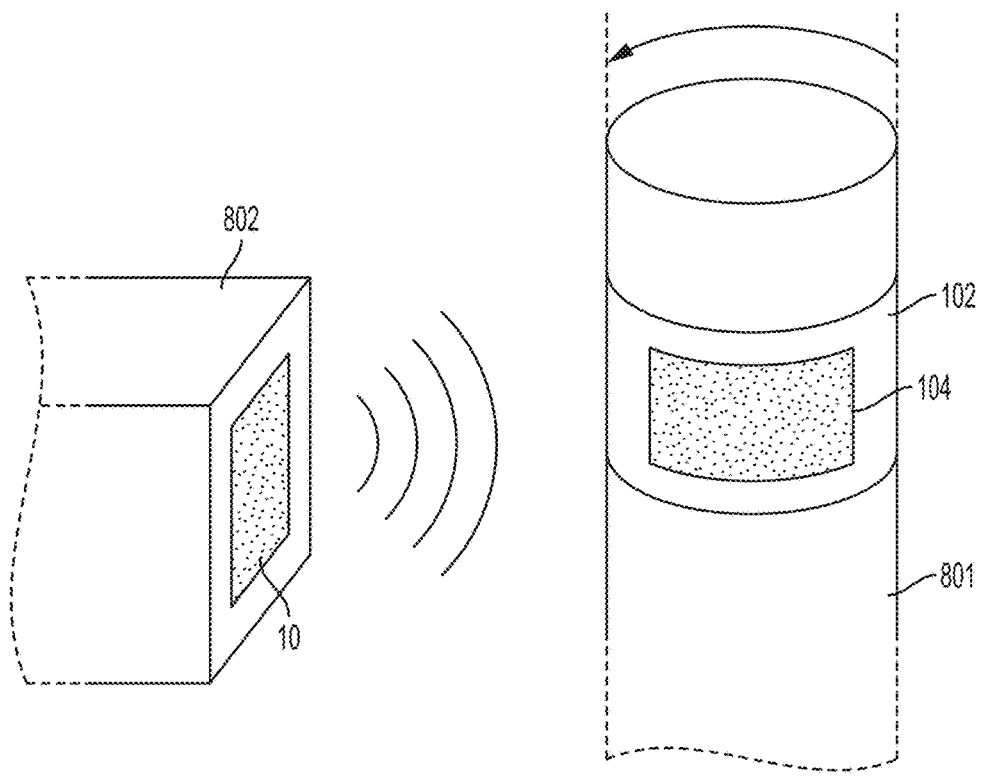
FIG. 8 is a schematic view illustrating a system for harvesting electromagnetic energy using a flexible antenna, according to some non-limiting embodiments.

Electronic system 700 may be used for a variety of applications, including in military, healthcare and industrial settings. In some embodiments, a system like electronic system 700 may make up a passive sensor node, powered by energy harvested with an energy harvesting antenna of the types described herein. For example, flexible antenna 100 may be disposed on a piece of industrial machinery to harvest electromagnetic energy and to power a sensor monitoring operation of the machinery. An example is monitoring the operation of a motor shaft. FIG. 8 illustrates an example.

FIG. 8 illustrates a motor shaft 801 having a flexible antenna 100 disposed thereon. Motor shaft 801 may be configured to rotate. The flexible antenna may be oriented such that metal layer 104 faces away from motor shaft 801. Sensor 710 may be configured, in some embodiments, to sense the angular velocity and/or the angular accelerations of motor shaft 801. Charging antenna 10 may be disposed on stationary frame 802, and may be configured to emit electromagnetic energy toward flexible antenna 100.

What is claimed is:

1. A far-field flexible energy harvesting antenna comprising:
 a flexible substrate having a first side and a second side opposite the first side;
 a first metal layer disposed in contact with the first side of the flexible substrate;
 a second metal layer disposed in contact with the second side of the flexible substrate; and
 one or more conductive vias electrically connecting the first metal layer with the second metal layer
 wherein the far-field flexible antenna is configured as a dual polarization antenna.

2. The far-field flexible energy harvesting antenna of claim 1, wherein the first metal layer is sized to resonate at a frequency that is within an industrial, scientific and medical (ISM) band.

3. The far-field flexible energy harvesting antenna of claim 1, further comprising a charging antenna positioned at a distance from the flexible substrate that is greater than a resonant wavelength of the first metal layer.

4. The far-field flexible energy harvesting antenna of claim 3, wherein the distance is less than 10 m.

5. The far-field flexible energy harvesting antenna of claim 1, wherein the first metal layer forms a patch antenna.

6. The far-field flexible energy harvesting antenna of claim 1, wherein the flexible substrate comprises a plurality of flexible layers alternating with a plurality of bonding layers.

7. The far-field flexible energy harvesting antenna of claim 6, wherein the flexible substrate further comprises a stiffener layer covering the first metal layer.

8. The far-field flexible energy harvesting antenna of claim 6, wherein at least one of the plurality of flexible layers has a tensile strength that is between 50 Kpsi and 1000 Kpsi.

9. The far-field flexible energy harvesting antenna of claim 1, wherein the first metal layer forms a patch antenna and the second metal layer forms a ground plane.

10. The far-field flexible energy harvesting antenna of claim 9, wherein the ground plane is larger than the patch antenna.

11. A far-field flexible energy harvesting antenna comprising:
a flexible substrate having a first side and a second side opposite the first side;
a metal layer disposed in contact with the first side of the flexible substrate;
an electronic device disposed in contact with the second side of the flexible substrate; and
one or more conductive vias electrically connecting the metal layer with the electronic device.

12. The far-field flexible energy harvesting antenna of claim 11, wherein the electronic device comprises a sensor.

13. The far-field flexible energy harvesting antenna of claim 11, wherein the metal layer is sized to resonate at a frequency that is within an industrial, scientific and medical (ISM) band.

14. A method of harvesting energy with an antenna, comprising:
capturing electromagnetic energy transmitted from a wireless power source using a first metal layer disposed in contact with a first side of a flexible substrate, the flexible substrate being positioned in a far-field region of the wireless power source;
coupling the captured electromagnetic energy to a second metal layer disposed in contact with a second side of the flexible substrate via one or more vias connecting the first metal layer to the second metal layer; and
powering an electronic device with the captured electromagnetic energy.

15. The method of claim 14, wherein the electromagnetic energy comprises a first polarization and a second polarization.

16. The method of claim 15, wherein coupling at least part of the captured electromagnetic energy to the second metal layer comprises coupling the first polarization using a first via of the one or more vias and coupling the second polarization using a second via of the one or more vias.

17. The method of claim 14, wherein the flexible substrate is positioned at a distance from the wireless power source that is greater than a wavelength of the electromagnetic energy.

18. The method of claim 14, wherein capturing the electromagnetic energy comprises resonant-coupling the wireless power source with the first metal layer.

19. The method of claim 14, further comprising rotating the antenna about a rotation axis of a rotatable machine component.

20. The method of claim 14, wherein the electromagnetic energy has a frequency that is within an industrial, scientific and medical (ISM) band.

* * * * *